May 24, 1938.  C. L. OSWALD  2,118,569
TRAP
Filed Jan. 17, 1935
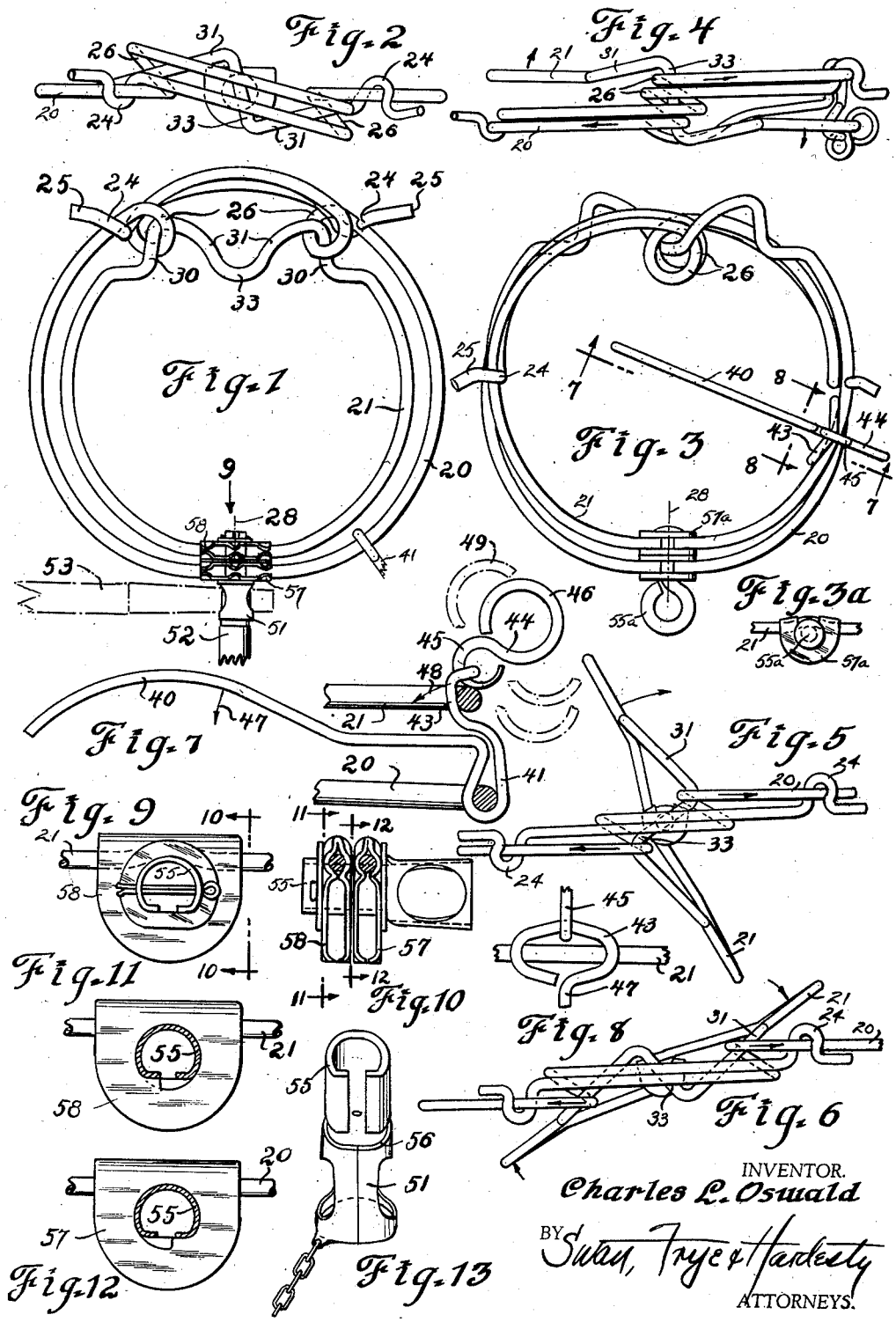
INVENTOR.
Charles L. Oswald
BY Swan, Frye & Hardesty
ATTORNEYS.

Patented May 24, 1938

2,118,569

UNITED STATES PATENT OFFICE 2,118,569

TRAP

Charles L. Oswald, Pontiac, Mich.

Application January 17, 1935, Serial No. 2,246

35 Claims. (Cl. 43—85)

This invention relates to animal traps, and is directed particularly to the provision of an improved trap for wild game, suitable for use either on land or under water, and incorporates numerous advantages among which are extreme lightness, compactness and easy portability, an extremely simple and automatic self-locking feature for preventing opening of the jaws by reverse pressure, as well as disposition of the jaws in such manner that the trapped animal is caught by the body and instantly killed, yet its pelt is not damaged. The last mentioned feature will be recognized as constituting a marked improvement over the only practicable light-weight traps heretofore used for trapping game, which have relied upon catching animals by one foot, and which are therefore not only grossly inhumane, but frequently allow animals to escape with the loss of a foot.

Another important object is the novel arrangement in such a trap of a pair of pivotally interconnected ring-like jaws in such manner that one acts as a spring tending to spin one ring with relation to the other from a set to a sprung position, auxiliary springs being thus completely eliminated, and so connected also that upon springing, the jaws are immediately locked against being opened by reverse pressure.

Still another object is the provision of improved pivotal connection between the spinning ring-jaws, which connection is of such nature that the trap as a whole may be supported in a desired position and held against turning, yet the jaws are free to spin with relation to each other.

A still further object is the provision of a trap construction so designed and constructed that when laid flat upon the ground it tends upon springing to jump vertically into the air and so throw itself upon the game to be trapped.

Improvement of the tripping means of game traps, and complete elimination of sliding friction therefrom in such fashion that trip operation is virtually unaffected by rust is still another object, as is also the incorporation in such tripping mechanism of improved and very simple means whereby the ease of tripping may be adjusted, to regulate the force required to spring the trap.

Other objects and advantages will be apparent from the following description wherein reference is made to the accompanying drawing illustrating preferred embodiments of my invention, and wherein similar reference numerals designate similar parts throughout the several views.

In the drawing:

Figures 1 and 2 are side and top views respectively of a preferred form of my invention, showing the jaws in relaxed or sprung position.

Figures 3 and 4 are similar side and top views of such a trap provided with a somewhat modified pivot construction and showing the jaws in set position;

Figure 3a is a detail of the modified pivot.

Figures 5 and 6 are top views successively showing the trap parts in positions assumed during springing.

Figures 7 and 8 are enlarged detail sections of the trip means, taken as if on lines 7—7 and 8—8 respectively of Figure 3, and looking in the direction of the arrows.

Figure 9 is a top view of the preferred pivotal connecting means for the ring-like jaw and spring elements, taken looking in the direction indicated by the arrow 9 of Figure 1;

Figure 10 is a side view of such pivotal connecting means, fragmentarily showing the jaw rings in section, taken substantially on the line 10—10 of Figure 9 and looking in the direction of the arrows.

Figures 11 and 12 are detailed sections of the pivot construction, taken substantially on the lines 11—11 and 12—12 respectively of Figure 10 and looking in the direction of the arrows.

Figure 13 is a perspective view of the combined pivot and supporting element which carries these portions, and the entire trap when supported as shown in Figure 1.

Referring now to the drawing, reference character 20 designates the outer of the two spinning rings which constitute the jaws of my improved trap. Such outer ring also acts as the actuating spring, and is accordingly preferably formed of spring wire, or is suitably tempered. Its ends are lapped, and the extremities preferably hooked or coiled somewhat about the portions of itself overlapped by such ends, in the manner indicated at 24, such coiling being of course loose enough to allow free slidability of these ends over the parts they encircle. The ends are then bent outwardly to terminate in finger grip portions 25 adapted to assist in setting the trap, in a manner which will presently be described.

Between the finger grips and lying adjacent the same when the trap is relaxed or sprung, (as shown in Figure 1) the outer ring is looped to form eyelets 26 which extend inwardly substantially radially from the outer ring. The loops 26 are inclined axially out of the plane of the trap to allow them to move freely over the inner ring 21, which passes therethru, and to enable the exertion of a camming action upon such ring to spin it, as will presently be described.

At a point opposite and substantially equidistant from the loops 26 the inner jaw ring 21 is pivotally connected to the outer ring 20 by means, presently to be described in detail, but as to which it suffices for the present to say that the inner and outer rings are thereby rendered rotatable relatively to each other about a diametrical axis, designated 28, extending through such pivotal connection at one side and midway between the loops 26 at the other.

The contour of the inner ring 21 is clearly shown in Figures 1 and 2. It will be seen to be substantially symmetrical and that the parts encircled by the loops 26 when the trap is relaxed are stepped to provide substantially parallel portions 30 so disposed that when the trap is sprung the loops 26 tend to hold the rings concentric and in a common plane in the manner shown in Figures 1 and 2. The outer spring ring 20 is so tensioned that it tends to expand and the loops 26 accordingly tend to separate circumferentially.

Between the parallel parts 30 the ring 21 is provided with portions 31 which are angularly bent laterally out of the plane of the trap in the manner best shown in Figure 2, and curved radially inwardly in the manner best shown in Figure 1, so that at the ends nearest the center of the trap the portions 31 are separated by a considerable distance. Such ends are connected by a transverse section 33, also integral and preferably angled with respect to the axis of the trap in the manner shown. The contouring of these parts with relation to the loops 26 is such that when the loops are forced together by contracting the outer ring, which is effected by manually separating the finger grip portions 25 circumferentially, the loops 26, in moving from their most remote (Figure 1) position to their closest (Figure 3) position, spin the inner ring through 180° with relation to the outer, and then lie directly alongside each other and occupy the transverse connecting portion 33, as shown in Figures 3 and 4.

It will be apparent upon studying Figure 4 that the circumferential draw exerted upon loops 26 by the outer ring in expanding when the trap is released, is first transmitted to the transverse section 33. During springing, the inner ring is first turned by the application of force to these parts by the separating loops, which after leaving the extremities of the transverse section 33 (Figure 5) travel along the inclined portions 31 in the manner indicated in Figure 6, continuing to turn the inner ring 21 until it reaches the position shown in Figures 1 and 2. It will also be seen that as the rings in moving from set to sprung position pass an indefinite angle somewhere near that shown in Figure 6, reversal of the rings by back pressure becomes impossible, because such effort is expended in side pressure against the loops 26 and connected wire portions, tending to press the latter together, as will be readily apparent from the drawing. Struggles of trapped game therefore only tend to tighten the grip of the trap, because any disturbance which provides looseness is immediately taken up by further expansion of the loops and constriction by the jaws.

My preferred tripping mechanism, best shown in Figures 3, 7 and 8, comprises a bait arm 40, shown as formed of wire and extending generally radially inwardly when set, although it might obviously be formed of any desired material and contoured in any of various manners, and is indeed preferably sufficiently ductile to permit bending to different shapes by the trapper, to facilitate use of the trap in different positions and under different conditions. A continuation 41 of the bait arm is shown looped about the spring ring 20 to pivot the same thereupon, and the wire is continued therebeyond to provide a looped hook 43 which opens radially outwardly in the manner best shown in Figure 7. The hook 43 is adapted at its end to partly overlie the inner ring 21 when the trap is set. The end portion 43 may not only be hooked when viewed transversely as in Figure 7, but looped to provide a relatively wide top portion when viewed as in Figure 8, which top portion is V'd as shown in that view and in Figure 3, so that holding element 44 naturally centers itself thereupon. The holding element 44, also preferably formed of wire, is looped in the general form of a figure 8, the smaller looped portion 45 encircling the end 43 of the trip arm and being tapered to reduced thickness at its end. A larger loop 46 is formed by the other end of the wire to provide a convenient finger grip for the element.

It will be seen that when the trip and holding element are positioned as shown in Figure 7 the tendency of the ring portions held thereby to separate and so turn with relation to each other is prevented by parts 43, 44, the active center of the hooked portion 43, which lies at the apex of the V thereof shown in Figure 3, lying over the center of the held ring 21, while the looped end 45 of element 44 lies between these portions and acts as an anti-friction element between them, any movement of the bait hook 40 in the direction indicated by the arrow 47 tending to swing the hook 43 in the direction indicated by the arrow 48 and roll the element 44 through the dot-dash position indicated at 49 and to complete release. It will also be seen that by varying the angular disposition of the element 44 and so the thickness of the looped portion 45 which lies between hook 43 and ring 21, the relation of the centers of these elements may be varied and the ease with which the trap may be sprung thus adjusted. It will be apparent that when the trap is set with the thinnest portion of loop 45 of element 44 lying between the held parts, the angular over-center distance of the V'd portion of hook 43 is greatest with respect to the center of the held inner ring 21, while when element 44 is adjusted so that a thicker portion of loop 45 is interposed, the overcenter distance is less and element 44 may be more easily rolled, so that release is accordingly easier.

The swivel connecting means for the rings shown in Figures 1, 2 and 9 to 13 inclusive comprises a central pivot and supporting element 51, which may be formed in one piece and of sheet metal in the manner indicated in Figure 12. When installed the supporting portion 51 thereof projects beyond the outer loop, and this part is provided with portions (undesignated) apertured at right angles to each other and adapted to receive supporting stakes or the like in either of the fashions indicated at 52 and 53 in Figure 1. The active pivot pin portion of the element, designated 55, is of substantially semi-cylindrical contour, the flattened side being defined by the inturned ends of the cylindrically wrapped sheet metal stock. A shoulder 56 is also provided by the partial reduction of diameter so caused. The semi-cylindrical pin portion 55 is engaged by pivot clips 57, 58, the former attached to the inner ring and the latter to the outer. The aperture in the flattened pin-engaging portions of each of the clips 57, 58 is of such size as to rotatably fit the pin portion 55, but is not completely circular, ordinarily being only complete throughout approximately 270°. As a result, each clip, and so the ring attached thereto, may turn but 90° with respect to the pin, the two 90° movements so permitted, however, being in opposite directions from the set position, so that the rings are free to move with relation to each other through 180° when the trap is sprung, but cannot turn together in the same direction with respect to the supporting member.

As shown in Figs. 3 and 3a the pivot means may comprise a simple folded sheet metal clip as 57a fitted over the pivot portion of each ring and looped to clear the ring and allow passage of the simple wire pivot pin 55a through the space therebetween.

The operation of the trap may be briefly summarized as follows: Assuming the trap to be in the sprung position shown in Figures 1 and 2, it is of course first set, which is most conveniently effected by resting the pivoted bottom portion against some surface, such as the knee or other portion of the body of the manipulator, and pulling downward the grip portions 25, thereby closing the spring ring formed by the outer wire element to smaller diameter and drawing together the loops 26, which during such movement swing the inner ring with respect to the spring ring, acting upon the cam portions 31 to turn the inner ring until the angle between the loop portions 26 and cam portions 31 of the swinging ring is no longer a wedging angle, that is, until it is possible to move the loops further toward each other and continue the contraction of the outer spring ring by continuing the swinging of the rings in the same direction with the fingers, although of course virtually the entire movement of substantially 180 degrees may if desired be imparted by direct actuation of the loops 26 through the finger portions 25. When the rings are in the set position they are held so by hooking the portion 45 over the swinging ring in the manner best shown in Figure 7. The trap may simply be laid upon the ground or stood, hung or fastened in a runway or hole. It functions equally well under water. If supported in upright position it is preferably so arranged that the animal must try to pass through it, and so is forced to strike the trigger, while if laid flat, the slightest touch upon the trigger is sufficient to roll the holding piece 45 over center and free the rings for swinging movement under the influence of the spring ring, which in expanding twirls the inner ring 21 with respect to the spring ring 20, catching the body of the animal between the approaching parts of the swinging rings, whose tendency is to assume the co-planar relation shown in Figure 1. The initial movement of ring 20 is very fast, due to the direct action of the actuating loops 26 upon the transverse portion 33, while after the loops have left such portion in their separating movement, to travel outward over the more gradual portions 31, in the manner best indicated in Fig. 6, greater force is exerted and the rate of travel becomes relatively slower, the force becoming relatively very great as the loops approach the stop portions 30 which arrest their expanding movement. If the trap is large enough in proportion to the animal caught between the approaching ring portions 20—21 so that they can quickly reach some such angle as is illustrated in Fig. 6 before firmly engaging the animal, it will be seen that not only is the tightening action very great, but that the loops have moved outward and away from the pivotal axis of the two rings far enough to lock them against return movement. Thereafter the rings can only be swung back toward set position by returning the loops to positions nearer the axis, (by means of the finger grips) which of course the animal cannot do, so that the jaws are absolutely locked upon the animal's body, and constantly drawn tighter upon it as the loops slide outward over the jaws and draw them together. The effect is to kill the animal practically instantaneously, and in use of these traps I have never seen evidence that an animal lived long enough to raise a struggle, let alone suffer for any extended period. The pelts are not injured because the jaws may be smooth and rounded and their action entirely one of constriction.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a trap, a pair of looped jaw members rotatable with relation to each other about a substantially fixed axis, at least one of said jaw members being formed of spring material and having a portion movable toward and from said axis and slidably engaging the other jaw member to induce turning of said other jaw member with relation to the member having said movable portion, about said fixed axis, from a set to a sprung position, and holding and trigger portions for maintaining the jaw members in set relation and for releasing the same for movement to a sprung position.

2. A trap comprising a pair of relatively swingable jaw elements, at least one of which is formed of resilient material and so connected to the other as to act as a spring to induce swinging movement thereof from a set to a sprung position, and holding and trigger means for maintaining the jaw elements in set relation and for freeing the same for movement toward sprung position, a portion carried by one element being slidable relatively to and engageable with the other to lock said elements against undesired reverse movement toward set position.

3. A trap comprising a pair of looped jaw members rotatable with relation to each other about a substantially fixed axis, one formed of resilient material and serving as a spring and having a portion movable toward and from said axis and slidably engaging the other jaw member to induce turning of said other jaw member with relation to the member having said movable portion, about said fixed axis, whereby upon movement of the jaw members to a set position the resilient spring member is stressed and tends to return them to sprung relation, and holding and trigger portions for maintaining said jaw members in set relation and for releasing the same for movement to sprung position, said jaw portion movable toward and from the fixed axis blocking the other jaw member against return movement.

4. A trap comprising a pair of pivotally interconnected looped jaw members swingable with relation to each other about a substantially fixed transverse axis, one of said looped jaw members being formed of distortable resilient material, constituting a spring, an actuating and locking portion carried by said jaw member comprising the spring and movable in another direction from said direction of swingable movement, said actuating and locking portion slidably engaging the other jaw member, whereby upon movement of said members to a set position the stressing of the spring member thereby induced tends to swing one of the jaw members with relation to the other about said axis to a released position, and holding and trigger portions for maintaining said jaw members in set relation and for releasing the same for movement to sprung position.

5. A trap comprising a pair of substantially coaxial ring members, means pivotally connecting said ring members for swinging movement about a diametrical axis, one of said rings being formed of resilient material and having a free end portion circumferentially movable relatively to the other, circumferentially movable actuating means connecting said resilient ring and the other ring for swinging one with relation to the other upon movement of said free end, and holding and trigger portions for maintaining said ring members in set relation and for releasing the same for movement to sprung position.

6. A trap comprising a pair of substantially coaxial rings, means pivotally connecting said rings for swinging movement about a substantially diametrical axis, one of said rings being formed of spring material and having free ends and actuating portions appurtenant said ends slidably connected to the other ring to induce swinging movement thereof when said ring having the free ends is so distorted as to cause circumferential movement of said actuating portions along the other ring, and holding and trigger portions for maintaining said rings in set relation and for releasing the same for movement to sprung position.

7. A trap comprising a pair of substantially coaxial rings, means pivotally connecting said rings for swinging movement about a substantially diametrical axis, one of said rings being formed of spring material and having free ends movable circumferentially by distorting and stressing such ring, said ring also having actuating portions appurtenant its free ends and slidably connected to the other ring on opposite sides of said axis in such manner that relative movement of said free ends and actuating portions induces rotative movement of said rings relatively to each other, and holding and trigger portions for maintaining said rings in set relation and for releasing the same for movement to sprung position.

8. A swingable jaw assembly for traps and the like comprising a pair of inter-pivoted ring elements revoluble about a substantially diametrical axis, one of said ring elements being formed of spring material and having free ends movable toward and from each other by distorting such ring element and actuating portions also carried by said ring element appurtenant its free ends and slidably connected to the other ring element, said other ring element having cam portions inclined out of concentricity with the remainder thereof and connected to and drivable by said actuating portions of the first mentioned ring element when said actuating portions are slid therealong, to turn one ring element relatively to the other.

9. A trap comprising a pair of inter-pivoted ring elements revoluble about a substantially diametrical axis, one of said ring elements being formed of spring material and having free ends movable toward and from each other upon distortion of such ring element, actuating portions also carried by said ring element appurtenant its free ends and slidably connected to the other ring element, said other ring element having cam portions inclined out of concentricity with the remainder thereof and connected to and drivable by said actuating portions of the first mentioned ring elements when said actuating portions are slid therealong, to turn one ring element relatively to the other, means for holding said ring elements in a set position in which said first mentioned ring element is stressed, and trip means for releasing said holding means whereby said actuating portions may move relatively to the cam portions.

10. In a trap construction, a pair of substantially concentric mutually rotatable looped wire jaw elements, one of said elements being formed of spring material and having end portions independently movable to distort said member, whereby a desired spring tension may be applied thereto, means carried by said ring member for rotatively actuating the other, and trip means for releasably holding said ring member in tensioned condition.

11. In a trap construction, a pair of substantially concentric mutually rotatable jaw members of substantially annular form, one of said jaw members being formed of spring material and having end portions movable relatively to each other when said member is distorted to impose a spring tension thereupon, and interengaging cam actuating portions connecting said movable end portions and the other member to rotate one member relatively to the other upon movement of said movable end portions.

12. In a trap construction, a pair of substantially concentric mutually rotatable jaw members of substantially annular form, one of said jaw members being formed of spring material and having end portions lapped over and movable toward and from each other when said member is distorted to impose spring tension thereupon, actuating portions carried by said movable end portions, and means providing a driving connection between said actuating portions and the other ring.

13. In a trap construction, a pair of relatively rotatable jaw members, one of said jaw members being formed of spring material and having free end portions movable toward and from each other when said member is distorted, actuating portions carried by said free ends, and means providing a driving connection between said free ends and the other jaw member.

14. In a jaw construction for traps and the like, a pair of jaw members looped to form closed rings and rotatable relatively to a common axis, one of said jaw members being formed of spring material and having at least one free end portion encircling and circumferentially movable relatively to both looped jaw members, and providing a driving connection between the jaw members for rotating the same and preventing reverse movement thereof when such end is circumferentially moved.

15. In a trap incorporating a swinging jaw and another member relatively to which the jaw is swingable, trip means for releasably holding said jaw and member in desired relation comprising a link element pivotally attached to one, and a holding element attached to said link and overengaging and rollable upon the other.

16. In a trap incorporating a swinging jaw and another member relatively to which the jaw is swingable, trip means for releasably holding said jaw and member in desired relation comprising a link element pivotally attached to one, and a holding element pivotally attached to said link and overengaged and rollable upon the other, said holding element having an active portion of graduated thickness whereby the extent of such overengagement and ease of tripping may be regulated.

17. In a trap incorporating a pair of swinging jaws, means pivotally interconnecting said jaws and providing a support for the trap, comprising a pivot pin element extending through and beyond said jaws, interengaging portions carried by said pin and jaws for limiting rotation of the latter relatively to the pin, and a supporting portion carried by the projecting end of the pin.

18. In a trap construction as set forth in claim 1, locking means slidable with respect to at least one of said rings and actuable by the other toward and from the axis of rotative movement of said rings to lock the rings against return movement when the locking means is sufficiently far from the axis.

19. In a trap construction, a pair of looped jaws each lying in substantially one plane and rotatable about an axis located generally in the same plane, one of said jaws being formed of spring material and connected to the other to induce turning movement thereof, and releasable trigger means for holding one of said jaws against turning movement with relation to the other.

20. In a trap construction as set forth in claim 19, locking means actuable by said jaw formed of spring material and actuable thereby into engagement with a portion of the other jaw spaced from the axis of rotation thereof to lock said rings against undesired rotative movement.

21. In a trap construction as set forth in claim 5, locking means carried by one of said rings and slidable over the other during relative rotative movement thereof to a position spaced from their axis of pivotal connection, to lock said rings against return movement.

22. A strap comprising a pair of substantially coaxial jaw members, means pivotally connecting said jaw members for swinging movement about such axis, one of said jaw members being formed of spring material and having free ends, actuating portions appurtenant to said free ends slidably connected to the other jaw member to induce swinging movement thereof when the jaw member formed of resilient material is allowed to move from a stressed toward a relaxed position, and holding and trigger portions for maintaining said jaw members in a set relation in which said resilient jaw member is stressed and for releasing the same for movement to the sprung position in which said jaw member is relaxed.

23. A trap as set forth in claim 22 in which said actuating portions move during springing movement from a position close to a position farther from the axis of connection of said jaw members.

24. A trap as set forth in claim 22 in which said actuating portions are looped about said other jaw member and move during springing movement from a position close to the axis of connection of said jaw members to a position far enough therefrom to lock the jaw members against undesired swinging movement.

25. A trap as set forth in claim 22 in which said actuating portions when in one position also lock said jaw members against undesired swinging movement.

26. A trap as set forth in claim 7 in which said actuating portions move during springing movement from a position adjacent to a position farther from the axis of connection of said rings and when in the latter position lock the rings against undesired swinging movement.

27. A trap as set forth in claim 8 in which said actuating portions move during springing movement from a position adjacent to a position farther from the axis of connection of said ring elements and when in the latter position lock the ring elements against undesired swinging movement.

28. A trap construction as set forth in claim 9 in which said actuating portions move during springing movement from a position adjacent to a position farther from the axis of connection of said ring elements, and when in the latter position lock the ring elements against undesired swinging movement.

29. A trap construction as set forth in claim 10 including means actuable by one of said jaw elements slidably engaging the other, and movable during springing movement of the jaws from a position adjacent their pivotal axis to a position farther from the same to lock the jaw elements against undesired swinging movement when in sprung positions.

30. A trap construction as set forth in claim 11 in which the active parts of said cam actuating portions move during springing movement of the jaw members from a position closer to a position farther from the pivotal axis of the jaw members, and when in the latter position lock said members against undesired swinging movement.

31. A trap construction as set forth in claim 12 in which said last mentioned means includes a portion movable during springing movement of the jaw members from a position closer to a position farther from the axis of said jaw members, and when in the latter position locks said members against undesired swinging movement.

32. A trap construction as set forth in claim 13 in which said last mentioned means includes a portion movable during springing movement of the jaw members from a position closer to a position farther from the axis of said jaw members, and when in the latter position locks said members against undesired swinging movement.

33. A trap construction as set forth in claim 14 in which said means providing driving connection between the jaw members includes a portion movable during springing movement of the jaws from a position closer to a position farther from the axis of rotation of the jaw members, and which when in the latter position locks said jaw members against undesired swinging movement.

34. In a trap construction as set forth in claim 19, locking means actuable by said jaw formed of spring material and yieldably slidably actuable thereby along and in connection with the other jaw from a position closer to one farther from the pivotal axis of said jaws, to hold them against relative swinging movement.

35. In a trap, a pair of looped jaw members pivoted with relation to each other, and means for turning one with relation to the other, said jaw members having actuating portions movable toward and from the pivotal axis of at least one thereof and which pass each other when the trap is sprung, said actuating portions also acting to lock said jaw members against undesired swinging movement.

CHARLES L. OSWALD.